United States Patent [19]
Ricci et al.

[11] 3,821,916
[45] July 2, 1974

[54] CUTTING MACHINE FOR CHEESE AND THE LIKE

[76] Inventors: Angelo Ricci, 2790 24th St., San Francisco, Calif. 94103; Raffaele Banducci, 18 Prescott Ct., San Francisco, Calif. 94133

[22] Filed: Dec. 4, 1972

[21] Appl. No.: 311,967

[52] U.S. Cl. ............................ 83/200.1, 83/651.1
[51] Int. Cl. ............................................ B26d 1/00
[58] Field of Search ...................... 83/200.1, 651.1

[56] References Cited
UNITED STATES PATENTS

| | | | |
|---|---|---|---|
| 818,528 | 4/1906 | Drummond | 83/200.1 |
| 1,864,921 | 6/1932 | Mayer | 83/200.1 |
| 2,255,942 | 9/1941 | Salmon | 83/200.1 |
| 3,088,186 | 5/1963 | Mennitt | 83/651.1 X |

FOREIGN PATENTS OR APPLICATIONS

| | | | |
|---|---|---|---|
| 93,424 | 11/1938 | Sweden | 83/651.1 |
| 84,733 | 10/1935 | Sweden | 83/651.1 |

*Primary Examiner*—Willie G. Abercrombie
*Attorney, Agent, or Firm*—Alfons Puishes

[57] ABSTRACT

A machine utilizes a combination of portable table, cutting wire and handle in combination with a novel mechanism for facilitating movement of the wire through the material being cut and its return. Combination of elements prevents kinking and breakage of the cutting wire, insures a straight cut, as well as providing for ready securing of the machine to a table or counter.

6 Claims, 15 Drawing Figures

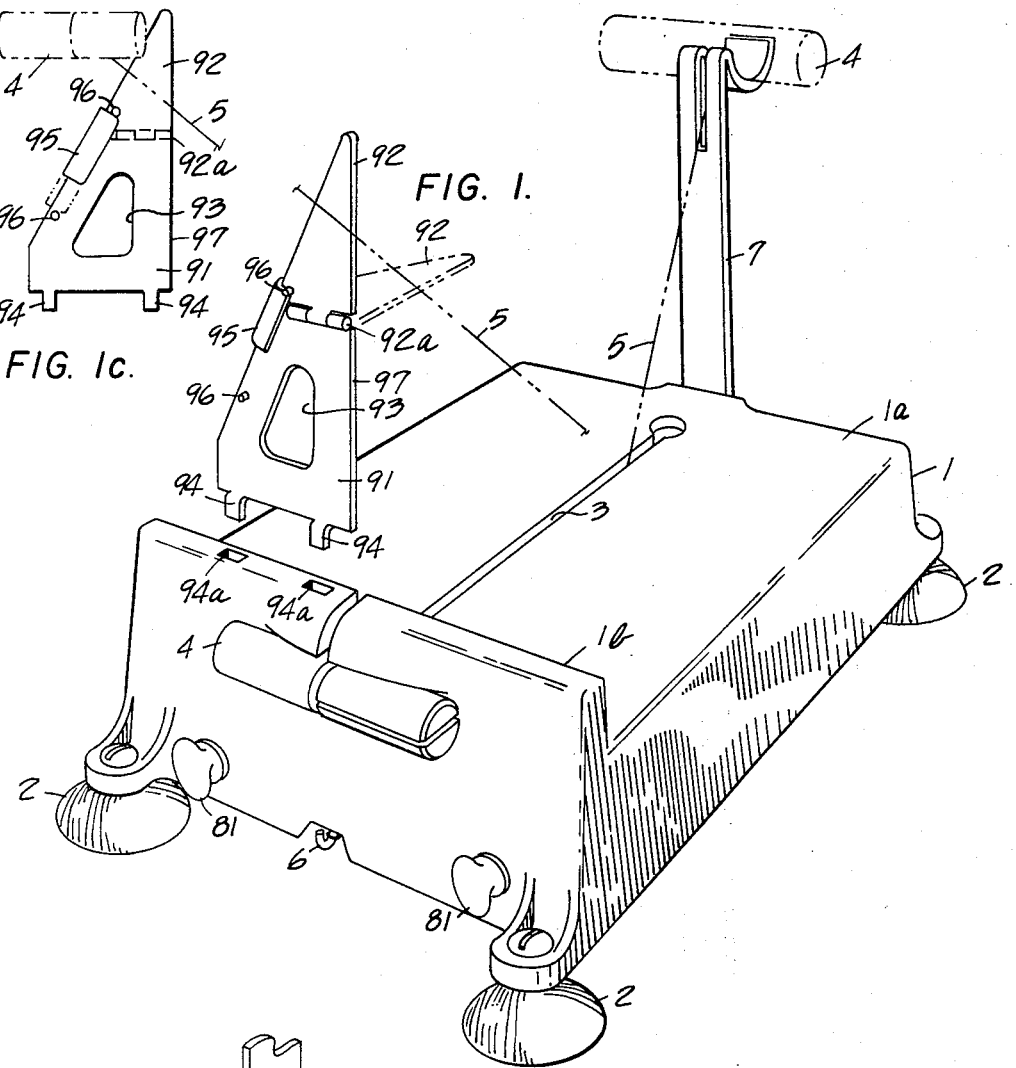

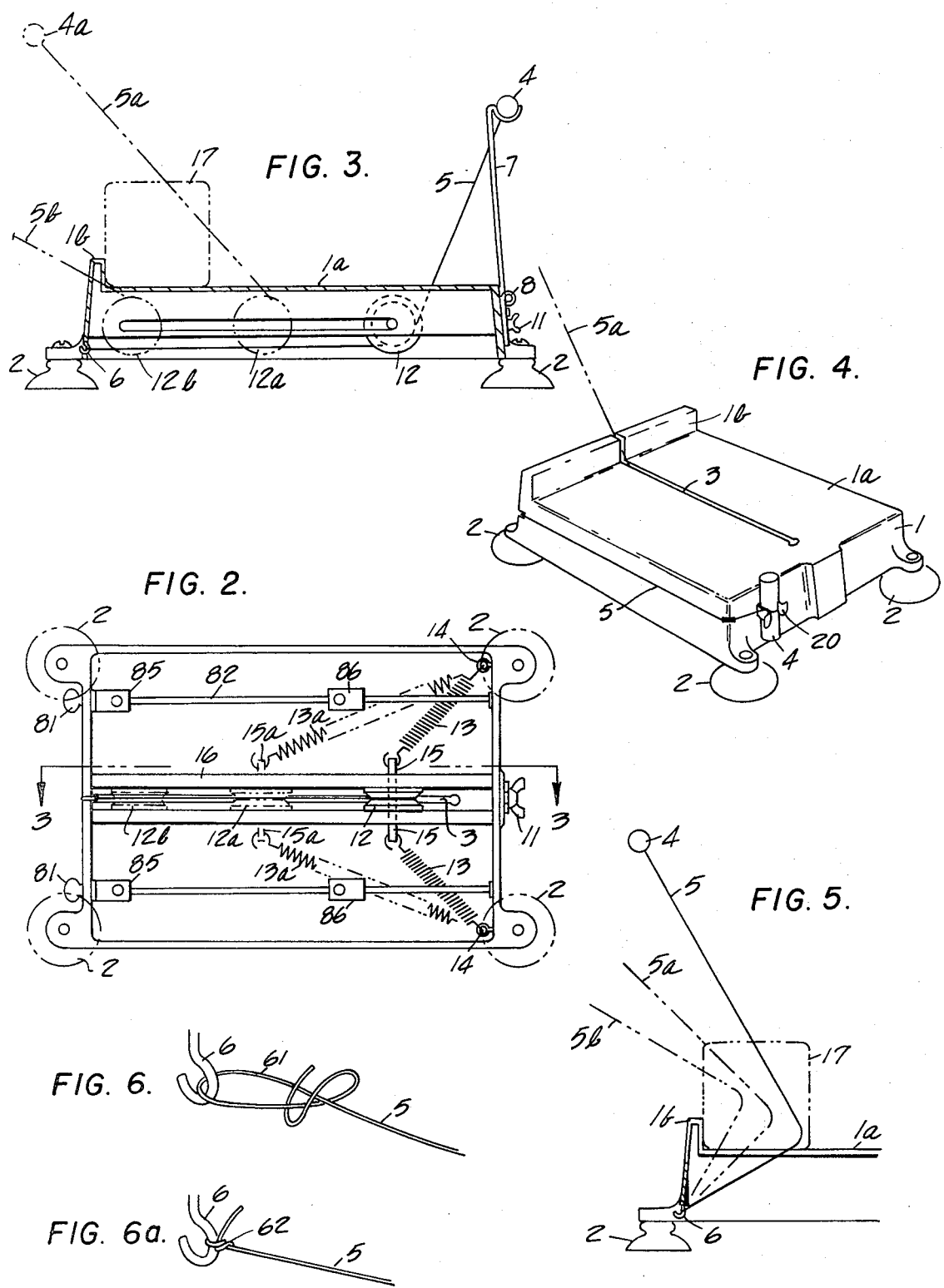

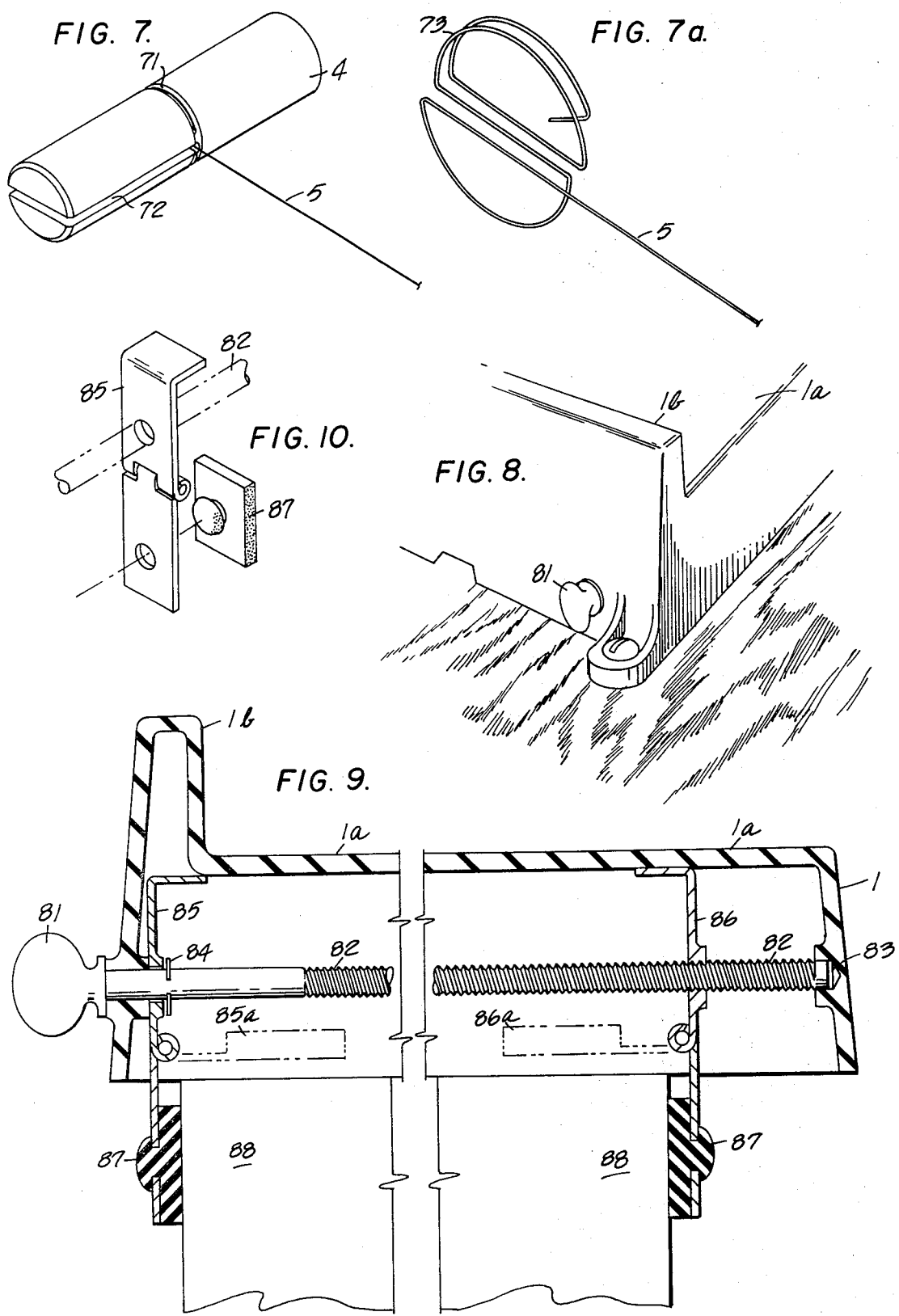

CUTTING MACHINE FOR CHEESE AND THE LIKE

BACKGROUND OF THE INVENTION

Devices utilizing wire for cutting cheeses, cakes, etc., are quite old.

Thus the U.S. Pat. to Mayer No. 1,864,921 discloses a basic combination of a cutting wire, handle, support platform, and hinged arms having slots for passage of the cutting wire.

Lenk U.S. Pat. No. 2,085,373 covers a circular base for support of the material being cut in combination with a radial wire cutting emanating from its center.

Tapparo U.S. Pat. No. 2,130,045 teaches a handle connected through a gear train to a winding drum upon which the cutting wire winds up while maintaining a loop form when not actually passing through the material.

Paldino U.S. Pat. No. 2,936,522 teaches a cutting table employing a cutting wire which winds on a spring-loaded take-up reel in combination with an adjustable back-up means.

Carturan U.S. Pat. No. 3,509,628 comprises a machine employing a pair of cutting wires disposed for simultaneous movement toward each other through the material being cut by means of a threaded shaft and rotating handle.

Salmon U.S. Pat. No. 2,255,942 teaches a table having a longitudinal slot for passage of the cutting wire with a handle on one end and spring retracting means on the opposite end. Salmon however, does not employ the novel mechanism to facilitate advancement and retraction of the cutting wire as do applicants. Applicants' invention avoids frequent kinking and breaking of the cutting wire by the action of its novel elements. Kinking and frequent breaking of the cutting wire is a common fault of previous devices such as Salmon.

SUMMARY OF THE INVENTION

We utilize a cutting wire and handle similar to those of the prior art, our wire passing through a longitudinal slot in a portable table. However, we cause our wire to pass over a traveling sheave which is disposed to ride in guide rails under the table against the action of springs. We thus maintain a constant tension on our cutting wire. When not in use we employ a retractable support for our cutting handle which performs the double purpose of supporting the handle and maintaining the predetermined tension on the cutting wire. This combination performs the added function of keeping the cutting wire free of the cutting table while the material being cut is moved from one position to another.

Another element of our machine designed to increase the life of the cutting wire and facilitate the use of wire from a roll instead of predetermined lengths, comprises the novel method of fastening the wire to the handle and to the stationary hook. These comprise the formation of novel loops made possible by the construction of our machine set forth more fully below. Further advantageous combinations of our machine comprise adjustable and retractable clamps which permit its fastening to a table, counter, or other means of support.

Where extremely hard substances are encountered as is the case with certain cheeses, our machine is constructed as to permit its satisfactory operation under these conditions also. We provide also a vertical cutting wire guide to insure a straight and true cut through the material.

DESCRIPTION OF THE DRAWINGS

FIG. 1 is an isometric view of the general assembly of a preferred embodiment of our invention.

FIG. 1a is a partial isometric view of the cutting handle holding bracket in its extended position.

FIG. 1b is a partial isometric view of the cutting handle holding bracket in its collapsed or retracted position.

FIG. 1c shows the vertical guide for the cutting wire.

FIG. 2 is a bottom view of the embodiment of FIG. 1.

FIG. 3 is a longitudinal section along lines 3—3 showing a piece of cheese or other material in process of being cut by the cutting wire.

FIG. 4 is an isometric view showing an alternate embodiment adapted for cutting especially hard cheeses and similar materials.

FIG. 5 is a partial end section showing the operation of the embodiment of FIG. 4.

FIGS. 6 and 6a shows two stages of a preferred method of fastening our cutting wire to its stationary holding hook.

FIG. 7 is an isometric view of the cutting handle showing slots for facilitating fastening of the cutting wire to the handle.

FIG. 7a shows a preferred method of fastening the cutting wire to the handle utilizing the slots of FIG. 7.

FIG. 8 is a partial isometric corner view of the base of our machine showing an alternate method of fastening the machine to a work table.

FIG. 9 is a partial longitudinal section through the machine showing detail of the clamping mechanism of our alternate embodiment.

FIG. 10 is an isometric detail of the clamping lugs of FIG. 9.

DESCRIPTION OF PREFERRED EMBODIMENTS

Referring now to the drawings, there is seen first the base or frame 1 of our machine which may be of wood, plastic, or other suitable material.

The base 1 is comprised of a flat or working section 1a and an angle or back-up section 1b. The base in turn is supported by legs 2 which may be suction cups of some elastomeric material.

Slot 3 serves for passage of cutting wire 5 which is secured to cutting handle 4. Respective positions of the handle 4 and cutting wire 5 during the operation of the machine are shown respectively at 4a, 5a, and 5b. One end of cutting wire 5 is attached to stationary hook 6 which projects beyond the outside of the malchine for convenience in replacement of the cutting wire as set forth below. The opposite end of cutting wire 5 is fastened to handle 4 in the manner described below.

When the cutting operation itself is not going on and particularly during periods when the material to be cut is being moved around on the surface 1a of base 1, handle 4 is supported by hinged or retractable holding bracket 7 as shown particularly in FIG. 1. Bracket 7 is shown in greater detail in FIG. 1a and FIG. 1b in which there is seen hinge member 8, slotted member 9 engaging pin 10 and secured by wing nut 11.

Referring now more particularly to FIG. 2 there is seen traveling sheave 12 which is shown in respective positions during its operation at 12a and 12b. Helical springs 13 have one end fastened to the frame of the machine by means of eyes 14 and the other end to traveling shaft 15 on which the sheave 14 rotates. Traveling shaft 15 is likewise shown in its respective position 15a during operation against the action of springs 13a.

Traveling shaft 15 in turn rides in guide rail 16.

This phase of the operation may be clearly seen also on FIG. 3 which illustrates the action of cutting wire 5 under the force of handle 4 around sheave 12. Sheave 12 in turn travels in guide rail 16 against the action of spring 13 and cutting wire 5 thus advances through and makes a cut in the block of material to be cut seen at 17.

Referring now more particularly to FIGS. 4 and 5, there is seen the manner in which our machine may be adapted for cutting through extremely hard material. Under extreme conditions it may be difficult to force wire 5 through such hard material against the action of sheave 12 and springs 13. For such an application we may temporarily dispense with our sheave, guide rail and spring mechanism and cause our cutting wire 5 to act directly on the material as shown. In this application we do not use our holding bracket 7 but wrap our cutting wire 5 around base 1 and snap our handle 4 in position in clamp 20.

Attention should now be had to FIGS. 6 and 6a in which we show a preferred method of securing our cutting wire 5 to stationary hook 6. In this method we form a loop 61 around hook 6, continue with a second loop back around wire 5 again and then back through loop 61, pulling this tight as shown at 62, thereby avoiding any sharp bends but obtaining a tight fastening to hook 6.

Attention should now be directed to FIGS. 7 and 7a. It will be seen that we utilize a circumferential slot 71 around the center portion of handle 4 and an axial slot 72 along the length of and across the end of handle 4. We are thus able to make a semi-circular loop 73 in slot 71 at its upper portion as shown and a second semi-circular loop at its lower portion, then bringing wire 5 around axially in slot 72. This likewise has the advantage of avoiding sharp corners or kinks and being adaptable to cutting wires of any length as they are supplied in spool form.

While the above described features of our invention shown on FIGS. 6, 6a, 7 and 7a are very important in prolonging the life of our cutting wire 5, there is another important element of our invention which also has the effect of increasing the efficiency of our cutting wire and its operation as well as producing a true or square cut through the cheese or other material being cut. This is our cutting wire vertical guide shown in FIG. 1 and FIG. 1c.

The guide comprises a removable member of generally triangular configuration having a lower section 91 and an upper section 92 joined together by a 90° hinge member 92a. Lower section 91 has an opening 93 through it to permit the user to better observe his cutting operation. Support or insert tongues 94 forming an integral part of lower member 91 are disposed for insertion in slots 94a located in angle or back-up section 1b of our machine. This combination permits ready removal of the guide when it is not needed or for cleaning purposes. To facilitate the utilization of the hinged feature of our guide we provide a slide 95 of generally U-shaped cross-section adapted for sliding on the inclined edge of our guide, being retained in position by a snug sliding fit and having its motion limited by stops 96. This may be utilized to maintain upper member 92 in a vertical position and in alignment with lower section 91 when large pieces of material are being cut. For smaller pieces, the slide 95 is caused to rest against the lower stop 96, thus permitting section 92 to assume a position at right angles to section 91 through the action of hinge member 92a. In either position the guide edge 97 functions to cause our cutting wire to travel always in a true perpendicular direction with reference to the material being cut. The thickness of the slice desired is adjusted by locating the material being cut horizontally on working section 1a and against back-up section 1b in proper relationship to vertical guide edge 97. This element of our machine may be fabricated from any suitable material, but we prefer to use sheet stainless steel both for structural and sanitary reasons.

Referring now to FIG. 8, FIG. 9, and FIG. 10, there are seen various views of an alternate method of securing our machine to a table or base.

Wing members 81, which are two in number, comprise a cylindrical shaft having a threaded section 82. One end of this member is caused to abut in pivot hole 83 and the opposite end carries back-up nuts 84.

A stationary hinged or retractable clamping leg 85 is positioned between frame 1 and nut 84. A movable hinged or retractable clamping leg 86 is in threaded engagement with screw member 82. Clamping legs 85 and 86 are equipped with gripping pads 87 which may be of rubber or other resilient or elastomeric material, as desired. These in turn are disposed to engage vertical sides of a table, counter, or other support means 88. Of course, only one of the clamping legs may be used where this is practicable, to provide the reaction necessary during the cutting operation itself. When not in use, clamping legs 85 and 86 may be placed in positions 85a and 86a respectively inside the hollow interior of base or frame 1 as shown.

We claim:

1. A cutting machine for cheese and the like comprising:
   a horizontal table;
   a longitudinal slot through said table;
   means for positioning material to be cut upon said table and across said slot;
   a guide rail positioned on the under side of said table in alignment with said slot;
   a movable sheave positioned on said guide rail;
      said sheave being disposed for rotating and translating motion with respect to said rail;
   a cutting wire passing through said slot and around said sheave;
   said cutting wire having one end fixedly positioned on said table and having a cylindrical handle positioned on its opposite end at right angles thereto;

spring means positioned between said table and said sheave;
   said spring means being disposed for urging said sheave against the forward motion of said cutting wire around said sheave;
      whereby a constant tension is maintained against said cutting wire when said cutting wire is in operation;

said handle being characterized by;
  a circumferential slot around its mid-section;
  diametrically opposite axial slots connecting with said circumferential slot;
  radial slots across the ends of said handle, said slots connecting with said axial slots;
  radial holes through said handle at the point of said circumferential slots;
  said slots and said holes being disposed to receive and fasten said cutting wire to said handle.

2. The machine of claim 1 including means for holding said handle in a fixed position on said table against the action of said springs whereby a constant tension is maintained against said cutting wire when said cutting wire is not in operation.

3. The machine of claim 2 in which said means for holding said handle comprises a retractable bracket, said bracket being characterized by:
  a first member disposed for fixed positioning on said table;
  a second member having one end in hinged relationship with said first member;
  holding means positioned on the other end of said second member and disposed for receiving and holding said handle in a fixed position against the action of said springs when said cutting wire is not in operation.

4. The machine of claim 1 including means for securing said machine to a work table comprising:
  a rotatable horizontal screw member positioned on said horizontal table in parallel relationship with said horizontal slot;
  a first vertical clamp positioned on said screw member and in rotating relationship therewith;
  a second vertical clamp positioned on said screw member and in threaded relationship therewith and in spaced relationship with said first clamp;
  said first clamp and said second clamp being disposed for engaging oppositely spaced vertical surfaces of a supporting base;
  said clamps being further characterized by 90° hinges positioned at approximately their vertical centers;
  said hinges being disposed for permitting said clamps to be rotated to a horizontal position parallel to the surface of said table when not in use;

means for rotating said horizontal screw.

5. In a cutting machine for cheese and the like utilizing a wire for cutting, an improved device for guiding the cutting wire in a vertical direction of translation through the material being cut comprising:
  a vertical member disposed for removable positioning on said machine and having a vertical guiding edge disposed for engaging said cutting wire;
  said member being characterized by a lower section and an upper section;
    said sections being formed by a 90° hinge positioned at right angles to said guiding edge,
  a sliding member disposed for engaging said member on an edge opposite to said guiding edge,
    whereby said lower and said upper sections may be maintained in the same vertical plane;
  means associated with said lower section for viewing the operation of said machine.

6. A cutting machine for cheese and the like comprising:
  a horizontal table;
  a longitudinal slot through said table;
  means for positioning material to be cut upon said table and across said slot;
  a guide rail positioned on the under side of said table in alignment with said slot;
  a movable sheave positioned on said guide rail;
    said sheave being disposed for rotating and translating motion with respect to said rail;
  a cutting wire passing through said slot and around said sheave;
  said cutting wire having one end fixedly positioned on said table and having a handle positioned on its opposite end;
  spring means positioned between said table and said sheave;
    said spring means being disposed for urging said sheave against the forward motion of said cutting wire around said sheave;
    whereby a constant tension is maintained against said cutting wire when said cutting wire is in operation;
  means for guiding said cutting wire in a vertical direction of translation while said cutting operation is in progress, said cutting means comprising;
  a vertical member disposed for removable positioning on said machine and having a vertical guiding edge disposed for engaging said cutting wire;
  said member being characterized by a lower section and an upper section;
    said section being formed by a 90° hinge positioned at right angles to said guiding edge;
  a sliding member disposed for engaging said member on an edge opposite to said guiding edge,
    whereby said lower and said upper sections may be maintained in the same vertical plane;
  means associated with said lower section for viewing the operation of said machine.

* * * * *